United States Patent
Ishii et al.

(10) Patent No.: US 9,529,889 B2
(45) Date of Patent: Dec. 27, 2016

(54) INFORMATION TERMINAL WITH APPLICATION PRIORITIZATION

(71) Applicant: DENSO CORPORATION, Kariya, Aichi-pref. (JP)

(72) Inventors: Yuichiro Ishii, Nagoya (JP); Yasutsugu Nagatomi, Chiryu (JP); Tadashi Kamada, Nagoya (JP)

(73) Assignee: DENSO CORPORATION, Kariya (JP)

( * ) Notice: Subject to any disclaimer, the term of this patent is extended or adjusted under 35 U.S.C. 154(b) by 409 days.

(21) Appl. No.: 14/202,244

(22) Filed: Mar. 10, 2014

(65) Prior Publication Data

US 2014/0280177 A1    Sep. 18, 2014

(30) Foreign Application Priority Data

Mar. 12, 2013    (JP) .................................. 2013-48668

(51) Int. Cl.
G06F 7/00     (2006.01)
G06F 17/30    (2006.01)

(52) U.S. Cl.
CPC .............................. *G06F 17/30598* (2013.01)

(58) Field of Classification Search
None
See application file for complete search history.

(56) References Cited

U.S. PATENT DOCUMENTS

| 9,084,105 B2 * | 7/2015 | Luna ..................... H04W 8/24 |
| 2012/0216208 A1 | 8/2012 | Takemura et al. |
| 2013/0038437 A1 * | 2/2013 | Talati .................... B60K 35/00 340/438 |

FOREIGN PATENT DOCUMENTS

| JP | 1995-085400 A | 3/1995 |
| JP | 11-139335 A | 5/1999 |
| JP | 2006-306242 A | 11/2006 |
| JP | 2007-022280 A | 2/2007 |
| JP | 2009-151649 A | 7/2009 |

OTHER PUBLICATIONS

Office Action mailed Mar. 24, 2015 in corresponding JP application No. 2013-48668 (with English translation).

* cited by examiner

*Primary Examiner* — Adam Alharbi
(74) *Attorney, Agent, or Firm* — Posz Law Group, PLC

(57) ABSTRACT

An information terminal, which is mounted on a vehicle and executes multiple applications, includes a categorizer, a selector, and an executer. The categorizer categorizes the applications into categories. The selector selects a priority application to be executed with high priority from each category according to a driving situation of the vehicle. The executer executes the priority application selected by the selector.

10 Claims, 6 Drawing Sheets

FIG. 2

| ID | APP NAME | FLAG | PRIORITY | F-CAM | P-CAM | I-CAM | IMAGE | RADAR | ALARM/CONTROL | TAG | C-DISP | M-DISP | SOUND |
|---|---|---|---|---|---|---|---|---|---|---|---|---|---|
| 01 | LANE DEPARTURE WARNING | a | 75 | ○ | | | ○ | | ○/− | LANE KEEP | ○ | ○ | ○ |
| 02 | LANE KEEP ASSIST | a | 90 | ○ | | | ○ | | ○/○ | LANE KEEP | ○ | ○ | ○ |
| 03 | FRONT COLLISION WARNING | c | 95 | ○ | | | ○ | ○ | ○/− | ANTI-COLLISION | ○ | ○ | ○ |
| 04 | PERIPHERAL MONITOR | c | 80 | ○ | ○ | | ○ | ○ | ○/− | ANTI-COLLISION & PARK ASSIST | ○ | ○ | ○ |
| 05 | AROUND VIEW | c | 85 | | ○ | | ○ | | ○/− | ANTI-COLLISION & PARK ASSIST | ○ | ○ | ○ |
| 06 | SIGN RECOGNITION (SPEED LIMIT) | b | 70 | ○ | | | ○ | | ○/− | SIGN & SPEED LIMIT | ○ | ○ | ○ |
| 07 | INTER-VEHICLE DISTANCE KEEP | b | 60 | ○ | | | ○ | | ○/− | INTER-VEHICLE DISTANCE | − | ○ | ○ |
| 08 | DRIVE RECORDER | | 20 | ○ | | | | | −/− | RECORD | ○ | | ○ |
| 09 | VIDEO CHAT | d | 10 | | | ○ | ○ | | −/− | COMMUNICATION | ○ | ○ | ○ |
| 10 | DRIVER MONITOR | d | 70 | | | ○ | ○ | | ○/− | FACE DIRECTION & DROWSINESS | | ○ | ○ |

FIG. 3

| | EXECUTION CONDITION | | HIGH PRIORITY APP ID | |
|---|---|---|---|---|
| FLAG | PARAMETER | THRESHOLD | LOW GROUP | HIGH GROUP |
| a | WAKEFULNESS | X | 02 | 01 |
| b | SPEED | Y (km/h) | 04<br>05 | 03 |
| c | CONGESTION | Z | 06 | 07 |

~42

INFORMATION TERMINAL WITH APPLICATION PRIORITIZATION

CROSS REFERENCE TO RELATED APPLICATION

This application is based on Japanese Patent Application No. 2013-48668 filed on Mar. 12, 2013, the contents of which are incorporated herein by reference.

FIELD

The present disclosure relates to an information terminal capable of executing multiple software applications available for similar uses.

BACKGROUND

Recently, a vehicle has been equipped with an information terminal which executes software applications to implement various functions such as to provide information including road information, traffic information, and entertainment information, to warn a driver of a danger, and to assist the driver in driving the vehicle.

JP-A-2011-100338 corresponding to US 2012/0216208A1 discloses an information terminal which executes multiple software applications. In JP-A-2011-100338, a processing time of each application is dynamically predicted, and each application is scheduled according to the predicted processing time. When an application which will not end within a specific period exists, the application is caused to prematurely end or a function of the application is restricted according to a preset priority.

SUMMARY

When the number of applications executed by the information terminal is large, there is a possibility that applications having similar uses are simultaneously executed. In this case, since hardware resources of the information terminal may be simultaneously used by the applications, troubles, such as overlap of output data from an output device, may occur. As a result, the applications cannot be suitably executed.

In JP-A-2011-100338, the applications are executed based only on a preset priority regardless of a driving situation of the vehicle. Therefore, it is not ensured that an application which should be executed with high priority is executed.

In view of the above, it is an object of the present disclosure to provide an information terminal capable of using hardware resources efficiently by executing an application which is selected from similar applications based on priority according to a driving situation of a vehicle.

According to an aspect of the present disclosure, an information terminal, which is mounted on a vehicle and executes multiple applications, includes a categorizer, a selector, and an executer. The categorizer categorizes the applications into categories. The selector selects a priority application from each category according to a driving situation of the vehicle. The priority application is an application to be executed higher priority than any other application in each category. The executer executes the priority application selected by the selector.

Preferably, the categorizer can categorize the applications into the categories according to their use so that similar applications with similar uses can be categorized into the same category.

Thus, the priority application is selected from similar applications in each category according to the driving situation of the vehicle and executed with high priority. That is, execution of the similar applications except the priority application is restricted. Therefore, hardware resources such as a central processing unit and an output device can be effectively used between the similar applications.

BRIEF DESCRIPTION OF THE DRAWINGS

The above and other objects, features and advantages of the present disclosure will become more apparent from the following detailed description made with reference to the accompanying drawings. In the drawings:

FIG. 2 is a diagram of an application database according to the embodiment;

FIG. 3 is a diagram of an exclusive database according to the embodiment;

DETAILED DESCRIPTION

Figure 1:
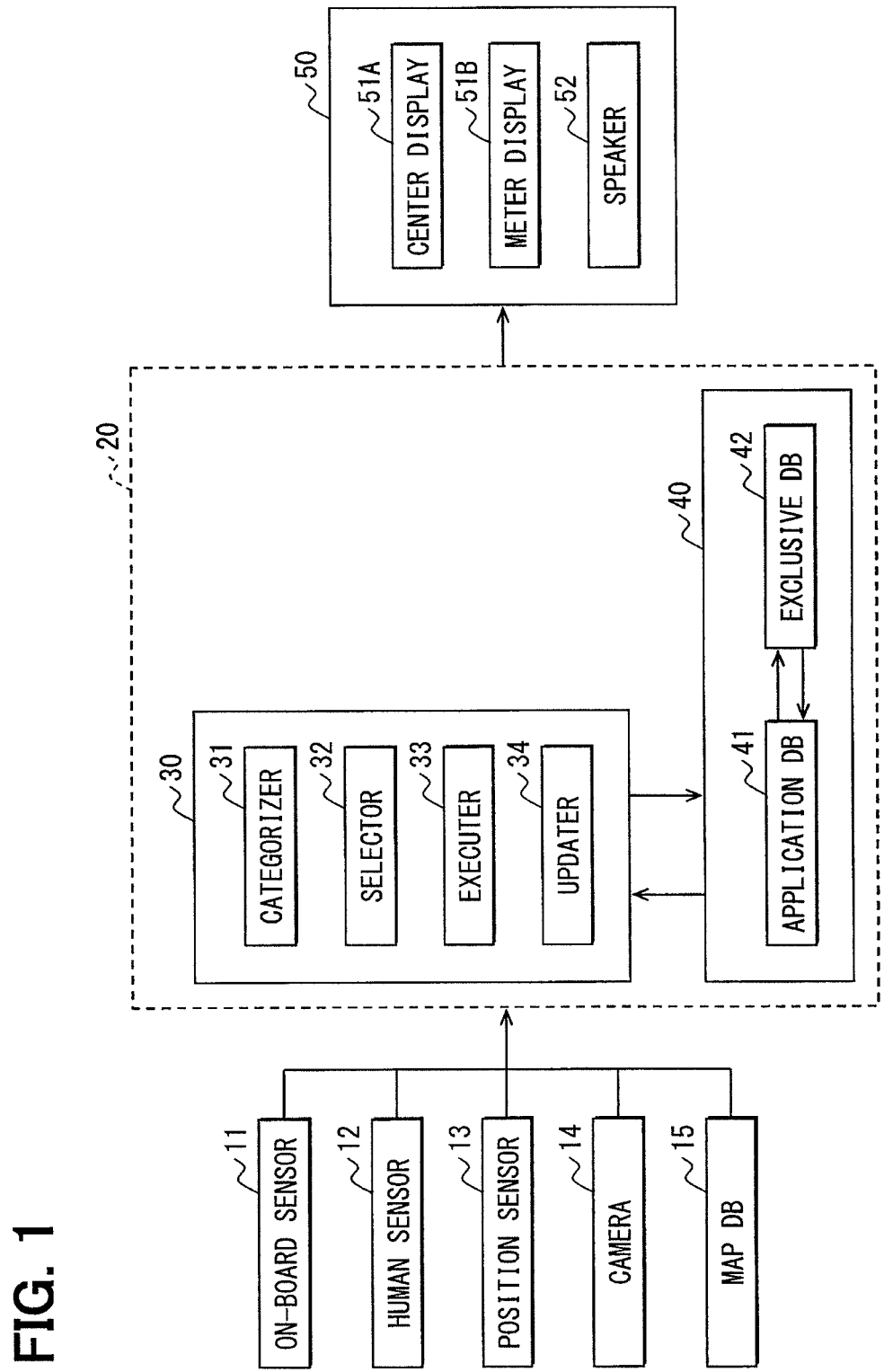
FIG. 1 is a block diagram of an information system according to an embodiment of the present disclosure.

An information terminal 20 according to an embodiment of the present disclosure is described below with reference to the drawings. The information terminal 20 is mounted on a vehicle and executes multiple software applications. According to the embodiment, the information terminal 20 is used in an information system shown in FIG. 1. The software application is hereinafter sometimes referred to as the "application".

The information system includes an on-board sensor 11, a human sensor 12, a position sensor 13, a camera 14, a map database (map DB) 15, the information terminal 20, and an output device 50. The output device 50 outputs a result of the execution of the application executed by the information terminal 20.

The on-board sensor 11 detects vehicle information including a speed of the vehicle, an acceleration of the vehicle, and an inter-vehicle distance between the vehicle and another vehicle. The on-board sensor 11 outputs the detected vehicle information to the information terminal 20. The human sensor 12 detects human information closely related to the degree of wakefulness of a driver and outputs the detected human information to the information terminal 20. For example, the human sensor 12 can include a heartbeat sensor capable of detecting a change in heartbeat of the driver and an eye camera capable of detecting eye movements of the driver. According to the embodiment, the human sensor 12 includes an in-vehicle camera for capturing an image of an area inside the vehicle and serves as the eye camera. The position sensor 13 detects position information related to a present position of the vehicle and outputs the position information to the information terminal 20. The camera 14 captures an image of an area outside and/or inside the vehicle and outputs image information related to the captured image to the information terminal 20. According to the embodiment, the camera 14 includes a front camera for capturing an image of an area ahead of the vehicle and a peripheral camera for capturing an image of an area around the vehicle. The map database 15 is a data storage that stores map information. For example, the map database 15 can include a DVD disc and a hard disk. The map database 15 outputs the map information to the information terminal 20.

According to the embodiment, the map database 15 is provided in the information system but provided outside the information terminal 20. Alternatively, the map database 15 can be provided in a storage device 40 of the information terminal 20. Further, alternatively, the map database 15 can be provided in a server on the Internet. When the map database 15 is provided in a server on the Internet, the information terminal 20 receives the map information wirelessly from the server.

The information terminal 20 is configured as a computer having a controller 30, the storage device 40, and an input/output (I/O) circuit, which are connected through buses.

The controller 30 obtains a vehicle's state from the vehicle information detected by the on-board sensor 11. Specifically, the controller 30 obtains a parameter for identifying a driving situation of the vehicle from the vehicle information detected by the on-board sensor 11. For example, the controller 30 obtains an actual measurement value of the vehicle speed as a parameter from the vehicle information detected by the on-board sensor 11. Further, the controller 30 obtains a driver's condition from the human information detected by the human sensor 12. Specifically, the controller 30 obtains a parameter for identifying the driving situation of the vehicle from the human information detected by the human sensor 12. For example, the controller 30 calculates and obtains an actual measurement value of the degree of wakefulness of the driver as a parameter from the human information detected by the human sensor 12.

Further, the controller 30 obtains a peripheral condition of the vehicle from the information sent from the on-board sensor 11, the human sensor 12, the position sensor 13, the camera 14, and the map database 15. For example, the peripheral condition can include road information related to a road where the vehicle runs. Specifically, the controller 30 calculates and obtains an actual measurement value of a degree of traffic congestion around the vehicle based on the image information sent from the camera 14. The controller 30 can obtain the actual measurement value of the degree of traffic congestion based on not only the image information sent from the camera 14 but also traffic information sent from an intelligent transport system (ITS). The controller 30 and each of the on-board sensor 11, the human sensor 12, and the camera 14 provide an obtaining device for obtaining an actual measurement value of a parameter for identifying a driving situation of the vehicle.

The controller 30 implements functions of a categorizer 31, a selector 32, an executer 33, and an updater 34 by executing programs. The categorizer 31 categorizes the applications into categories according to their use so that the applications with similar uses can be categorized into the same category. Further, the categorizer 31 divides the applications in each category into groups. Furthermore, the categorizer 31 assigns a parameter for identifying the driving situation, a parameter threshold for the parameter, and an exclusive flag to each category. Furthermore, when a new application is registered in an application database 41 of the storage device 40, the categorizer 31 registers the new application in an exclusive database 42 of the storage device 40 according to its use. The selector 32 selects a priority group, to which the application to be preferentially executed belongs, from the groups divided by the categorizer 31. Specifically, the selector 32 determines the priority group by comparing an actual measurement value of the parameter obtained by the obtaining device with a corresponding parameter threshold in each category. In normal times, the executer 33 executes the application based on priority assigned to the application. However, when the selector 32 selects the priority group, the executer 33 executes the application belonging to the priority group in priority to the application belonging to the other groups. The updater 34 updates the application database 41 by registering the new application in the application database 41.

The storage device 40 includes the application database 41 and the exclusive database 42. The applications to be executed by the executer 33 and attribute information items added to the applications are registered in the application database 41. The applications categorized by the categorizer 31 are registered into the exclusive database 42. Further, the parameter, the parameter threshold, and the exclusive flag assigned to each category are registered into the exclusive database 42. Details of the application database 41 and the exclusive database 42 are described later.

The output device 50 includes a center display 51A, a meter display 51B, and a speaker 52. Examples of the center display 51A and the meter display 51B can include a liquid crystal display (LCD) and an organic electroluminescence display (OELD). The center display 51A is located in the center of an instrument panel of the vehicle and displays the result of the execution of the application executed by the executer 33. The meter display 51B is located on the driver's seat side of the instrument panel and displays the vehicle speed and the result of the execution of the application executed by the executer 33. The speaker 52 outputs sound or voice as the result of the execution of the application executed by the executer 33.

Next, the application database 41, where the applications to be executed by the information terminal 20 are registered, is described. FIG. 2 shows an example of the application database 41.

As shown in FIG. 2, according to the embodiment, the applications registered in the application database 41 includes a lane departure warning application, a lane keep assist application, a front collision warning application, a peripheral monitor application, an around view application, a speed limit sign recognition application, an inter-vehicle distance keep application, a drive recorder application, a video chat application, and a driver monitor application, which are assigned with distinct identification (ID) numbers 01, 02, 03, 04, 05, 06, 07, 08, 09, and 10, respectively.

Further, as shown in FIG. 2, each of the applications registered in the application database 41 is provided with the attribute information items including an exclusive flag (FLAG), a priority item (PRIORITY), a front camera item (F-CAM), a peripheral camera item (P-CAM), an in-vehicle camera item (I-CAM), an image recognition item (IMAGE), a millimeter-wave radar item (RADAR), an alarm/control item (ALARM/CONTROL), a use tag item (TAG), a center display output item (C-DISP), a meter display output item (M-DISP), and a sound output item (SOUND).

The priority item indicates a priority value of the application. The executer 33 executes the application with a higher priority value in priority to the application with a lower priority value. The front camera item indicates whether or not the application uses data outputted from the front camera when being executed. The symbol "○" indicates the application which uses the data outputted from the front camera. The peripheral camera item indicates whether or not the application uses data outputted from the peripheral camera when being executed. The symbol "○" indicates the application which uses the data outputted from the peripheral camera. The in-vehicle camera item indicates whether or not the application uses data outputted from the in-vehicle camera when being executed. The symbol "○" indicates the application which uses the data outputted from the in-vehicle camera item. The image recognition item indicates whether or not the application uses data outputted from an image recognition device mounted on the vehicle when being executed. For example, the image recognition device can be incorporated in the camera 14 or the information terminal 20. The symbol "○" indicates the application which uses the data outputted from the image recognition device. The millimeter-wave radar item indicates whether or not the application uses data outputted from a millimeter-wave radar mounted on the vehicle when being executed. The symbol "○" indicates the application which uses the data outputted from the millimeter-wave radar.

The alarm/control item indicates a process performed by the information terminal 20 when the information terminal 20 executes the application. The symbol "○" in an alarm part of the alarm/control item indicates the application which causes the information terminal 20 to output an alarm. The symbol "○" in a control part of the alarm/control item indicates the application which causes the information terminal 20 to control a steering of the vehicle. The use tag item indicates a use or purpose of the application. The center display output item indicates whether the result of the execution of the application is outputted by the center display 51A. The symbol "○" indicates the application whose execution result is outputted by the center display 51A. The meter display output item indicates whether the result of the execution of the application is outputted by the meter display 51B. The symbol "○" indicates the application whose execution result is outputted by the meter display 51B. The sound output item indicates whether the result of the execution of the application is outputted by the speaker 52. The symbol "○" indicates the application whose execution result is outputted by the speaker 52. The exclusive flag is described later.

Next, the applications registered in the application database 41 are described in detail. In the description below, the number in parentheses added to the application name represents the ID number of the application.

The lane departure warning application (01) is executed based on output data of the front camera and the image recognition device in order to keep the vehicle in its intended lane. As the result of the execution of the lane departure warning application (01), an image of the recognized lane is displayed on the center display 51A. Further, when the vehicle begins to move out of the recognized lane, the lane departure warning application (01) outputs an alarm to the meter display 51B and the speaker 52 to prompt the driver to return the vehicle to the lane. The lane keep assist application (02) is executed based on output data of the front camera and the image recognition device in order to keep the vehicle in its intended lane. As the result of the execution of the lane keep assist application (02), an image of the recognized lane is displayed on the center display 51A. Further, when the vehicle begins to move out of the recognized lane, the lane keep assist application (02) outputs an alarm to the meter display 51B and the speaker 52 while controlling the steering of the vehicle so that the vehicle can return to the lane. The lane departure warning application (01) can be effectively used when the degree of wakefulness of the driver is high. In contrast, the lane keep assist application (02) can be effectively used when the degree of wakefulness of the driver is low.

The front collision warning application (03) is executed based on output data of the front camera, the image recognition device, and the millimeter-wave radar in order to prevent the vehicle from colliding with an obstacle ahead of the vehicle such as another vehicle or a pedestrian. As the result of the execution of the front collision warning application (03), an image of the area ahead of the vehicle is displayed on the center display 51A. Further, when the vehicle approaches the obstacle ahead of the vehicle, the front collision warning application (03) outputs an alarm to the meter display 51B and the speaker 52.

Each of the peripheral monitor application (04) and the around view application (05) provides peripheral information of the vehicle to the driver in order to prevent the vehicle from colliding with an obstacle around the vehicle such as another vehicle or a pedestrian and also in order to assist the driver in parking the vehicle. The peripheral monitor application (04) is executed based on output data of the front camera, the peripheral camera, the image recognition device, and the millimeter-wave radar. As the result of the execution of the peripheral monitor application (04), images of the areas ahead of and around the vehicle are displayed on the center display 51A. Further, when the vehicle approaches the obstacle around the vehicle, the peripheral monitor application (04) outputs an alarm to the meter display 51B and the speaker 52. The around view application is executed based on output data of the peripheral camera and the image recognition device. As the result of the execution of the around view application (05), an image of the area around the vehicle is displayed on the center display 51A. Further, when the vehicle approaches the obstacle around the vehicle, the around view application (05) outputs an alarm to the meter display 51B and the speaker 52. The front collision warning application (03) can be effectively used when the vehicle speed is high. In contrast, the peripheral monitor application (04) and the around view application (05) can be effectively used when the vehicle speed is low, for example, when the vehicle turns right or left, when the vehicle enters a wide road from a narrow road, or when the vehicle is being parked.

The speed limit sign recognition application (06) is executed based on output data of the front camera and the image recognition device in order to keep the vehicle speed within a speed limit of a road where the vehicle runs. As the result of the execution of the speed limit sign recognition application (06), the speed limit of the road is recognized from a speed limit sign on the road, and the recognized speed limit is displayed on the center display 51A. Further, when the vehicle speed exceeds the speed limit, the speed limit sign recognition application (06) outputs an alarm to the meter display 51B and the speaker 52. The inter-vehicle distance keep application (07) is executed based on output data of the front camera and the image recognition device to keep a safe distance between the vehicle and another vehicle ahead of the vehicle. As the result of the execution of the inter-vehicle distance keep application (07), a distance between the vehicle and the other vehicle is displayed on the meter display 51B. Further, when the distance between the vehicle and the other vehicle becomes less than a predetermined distance, the inter-vehicle distance keep application (07) outputs an alarm to the speaker 52. The speed limit sign recognition application (06) can be effectively used when there is no vehicle ahead of the vehicle. In contract, the inter-vehicle distance keep application (07) can be effectively used when there is another vehicle ahead of the vehicle.

The drive recorder application (08) is executed based on output data of the front camera in order to record images captured by the front camera while the vehicle runs. As the result of the execution of the drive recorder application (08), an image of the area ahead of the vehicle is displayed on the center display 51A, and sound outside the vehicle is outputted from the speaker 52. The video chat application (09) is executed based on output data of the in-vehicle camera and the image recognition device in order to allow a person inside the vehicle to conduct a face-to-face communication with a person outside the vehicle by means of the in-vehicle camera, for example, over a telephone network or the Internet. As the result of the execution of the video chat application (09), an image of the person outside the vehicle is displayed on the center display 51A, personally identifying information (e.g., name) of the person outside the vehicle is displayed on the meter display 51B, and voice of the person outside the vehicle is outputted from the speaker 52. The driver monitor application (10) is executed based on output data of the in-vehicle camera and the image recognition device in order to monitor whether the driver is dozing off. As the result of the execution of the driver monitor application (10), when it is determined that the driver feels drowsiness, an alarm is outputted to the meter display 51B and the speaker 52.

Next, the exclusive database 42, where the applications categorized by the categorizer 31 are registered, is described. FIG. 3 shows an example of the exclusive database 42 corresponding to the application database 41 shown in FIG. 2. As mentioned previously, the categorizer 31 categorizes the applications into categories according to their use so that the applications with similar uses can be categorized into the same category. Further, the categorizer 31 divides the applications in each category into groups. A rule for categorizing the applications into categories and dividing the applications in each category into groups is predetermined. The categorizer 31 categorizes and divides multiple applications in accordance with the predetermined rule.

Firstly, the categorizer 31 categorizes the applications into categories according to their use so that similar applications with similar uses can be categorized into the same category based on the use tag item, which is one of the attribute information items, added to each application. Since the use tag item indicates a use or purpose of the application, the applications with the same use tag items have the same uses. Therefore, even if any one of applications having the same use tag items is executed with high priority according to the driving situation, the driver can drive the vehicle safely.

As shown in FIG. 2, the lane departure warning application (01) and the lane keep assist application (02) have the same use tag item "lane keep". Therefore, the categorizer 31 categorizes the lane departure warning application (01) and the lane keep assist application (02) into the same category. Likewise, since the front collision warning application (03), the peripheral monitor application (04), and the around view application (05) have the same use tag "anti-collision", the categorizer 31 categorizes the front collision warning application (03), the peripheral monitor application (04), and the around view application (05) into the same category.

The speed limit sign recognition application (06) has the use tag item "sign & speed limit". The inter-vehicle distance keep application (07) has the use tag item "inter-vehicle distance". That is, the speed limit sign recognition application (06) and the inter-vehicle distance keep application (07) have different use tag items. However, both the use tag items "sign & speed limit" and "inter-vehicle distance" are added to the applications which are executed to keep the vehicle speed for safety. That is, the speed limit sign recognition application (06) and the inter-vehicle distance keep application (07) have similar uses. Therefore, the categorizer 31 categorizes the speed limit sign recognition application (06) and the inter-vehicle distance keep application (07) into the same category.

Further, the categorizer 31 assigns a parameter for identifying the driving situation to run the application, a parameter threshold for the parameter, and an exclusive flag to each category based on the use tag item. A relationship between the use tag item, the parameter, the parameter threshold, and the exclusive flag is predetermined and prestored in the exclusive database 42.

For example, the use tag item "lane keep" is assigned with the exclusive flag "a", the parameter "driver's wakefulness degree", and the parameter threshold "X". The use tag item "anti-collision" is assigned with the exclusive flag "c", the parameter "vehicle speed", and the parameter threshold "Y(km/h)". Both the use tag items "sign & speed limit" and "inter-vehicle distance" are assigned with the exclusive flag "b", the parameter "traffic congestion degree", and the parameter threshold "Z".

The categorizer 31 assigns the parameter, the parameter threshold, and the exclusive flag to each category based on the predetermined relationship between the use tag item, the parameter, the parameter threshold, and the exclusive flag.

Then, the categorizer 31 divides the applications in each category into a high group and a low group based on the attribute information items. When an actual measurement value of the parameter is higher than the parameter threshold, the application belonging to the high group is executed in priority to the application belonging to the low group. In contrast, when the actual measurement value of the parameter is not higher than the parameter threshold, the application belonging to the low group is executed in priority to the application belonging to the high group. A relationship between the attribute information items and the groups is predetermined and prestored in the exclusive database 42.

For example, in the category assigned with the exclusive flag "a", the alarm/control item "○/-" is assigned to the high group having the application to be executed with high priority when the degree of wakefulness degree of the driver is high, and the alarm/control item "○/○" is assigned to the low group having the application to be executed with high priority when the degree of wakefulness degree of the driver is not high. In the category assigned with the exclusive flag "c", the usage tag item "park assist" is not assigned to the high group having the application to be executed with high priority when the vehicle speed is high, and the usage tag item "park assist" is assigned to the low group having the application to be executed with high priority when the vehicle speed is not high. In the category assigned with the exclusive flag "b", the center display output item "○" is assigned to the high group having the application to be executed with high priority when the degree of the congestion is high, and the center display output item "-" is assigned to the low group having the application to be executed with high priority when the degree of the congestion is not high. In this case, the categorizer 31 divides the applications in each category into the high group and the low group based on the attribute information items as follows.

In the category assigned with the exclusive flag "a", the lane departure warning application (01) is classified as the high group, and the lane keep assist application (02) is classified as the low group. Therefore, when the driver's wakefulness degree is higher than the parameter threshold X, the lane departure warning application (01) is executed in priority to the lane keep assist application (02) so that a steering control function cannot be activated. In contrast, when the driver's wakefulness degree is not higher than the parameter threshold X, the lane keep assist application (02) is executed in priority to the lane departure warning application (01) so that a steering control function can be activated. In the category assigned with the exclusive flag "c", the front collision warning application (03) is classified as the high group, and the peripheral monitor application (04) and the around view application (05) are classed as the low group. Therefore, when the vehicle speed is higher than the parameter threshold Y, the front collision warning application (03) is executed in priority to the peripheral monitor application (04) and the around view application (05) so that a park assist function cannot be activated. In contrast, when the vehicle speed is not higher than the parameter threshold Y, the peripheral monitor application (04) and the around view application (05) are executed in priority to the front collision warning application (03) so that a park assist function can be activated. In the category assigned with the exclusive flag "b", the inter-vehicle distance keep application (07) is classified as the high group, and the speed limit sign recognition application (06) is classified as the low group. Therefore, when the traffic congestion degree is higher than the parameter threshold Z, the inter-vehicle distance keep application (07) is executed in priority to the speed limit sign recognition application (06) so that the center display 51A cannot display the result of the execution of the application. In contrast, when the traffic congestion degree is not higher than the parameter threshold Z, the speed limit sign recognition application (06) is executed in priority to the inter-vehicle distance keep application (07) so that the center display 51A can display the result of the execution of the application.

The exclusive flag, an exclusive execution condition consisting of the parameter and the parameter threshold, the ID number of the application belonging to the high group, and the ID number of the application belonging to the high group are registered into the exclusive database 42 according to each category. Further, when a new application is registered into the application database 41 by the updater 34, the categorizer 31 registers the new application into the exclusive database 42 based on attribute information items of the new application registered in the application database 41.

Figure 4:
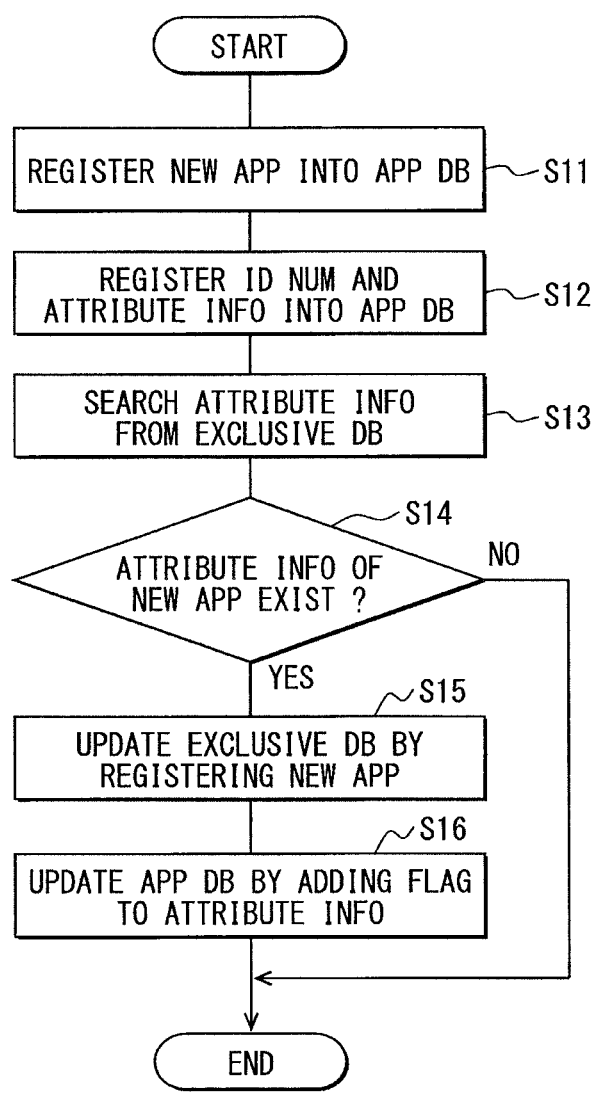
FIG. 4 is a flowchart of an update process according to the embodiment.

Next, an update process by which the updater 34 and the categorizer 31 register a new application in the application database 41 and the exclusive database 42 is described with reference to FIG. 4.

The update process starts at S11 where the updater 34 registers a new application into the application database 41 in response to an operation of a user. Then, at S12, the updater 34 registers an ID number and attribute information items of the new application into the application database 41.

Then, at S13, the categorizer 31 searches the attribute information items of the new application registered in the application database 41 from the attribute information items corresponding to the exclusive execution condition registered into the exclusive database 42. That is, the categorizer 31 searches the attribute information items of the new application from the attribute information items assigned to the high group and the low group in each category.

For example, when the new application is the lane departure warning application, the categorizer 31 searches the attribute information items of the lane departure warning application from the attribute information items assigned to the high group and the low group in each category. In this case, the attribute information items assigned to the high group in the category assigned with the exclusive flag "a", i.e., the use tag item "lane keep" and the alarm/control item "○/-" correspond to the attribute information items of the lane departure warning application.

Then, at S14, the categorizer 31 determines whether the attribute information items of the new application registered in the application database 41 exist in the attribute information items corresponding to the exclusive execution condition registered into the exclusive database 42. If the attribute information items of the new application does not exist corresponding to NO at S14, the update process ends.

In contrast, if the attribute information items of the new application exist corresponding to YES at S14, the update process proceeds to S15. At S15, the categorizer 31 updates the exclusive database 42 by registering the ID number of the new application to the group of the category assigned with the attribute information items of the new application. For example, when the new application is the lane departure warning application, the categorizer 31 registers the ID number "01" to the high group in the category assigned with the exclusive flag "a" and the paragraph "driver's wakefulness degree".

Then, at S16, the updater 34 updates the application database 41 by adding the exclusive flag, which is assigned to the new application in the exclusive database 42, to the attribute information items of the new application. For example, when the new application is the lane departure warning application, the updater 34 adds the exclusive flag "a" to the attribute information items of the lane departure warning application in the application database 41.

Figure 5:
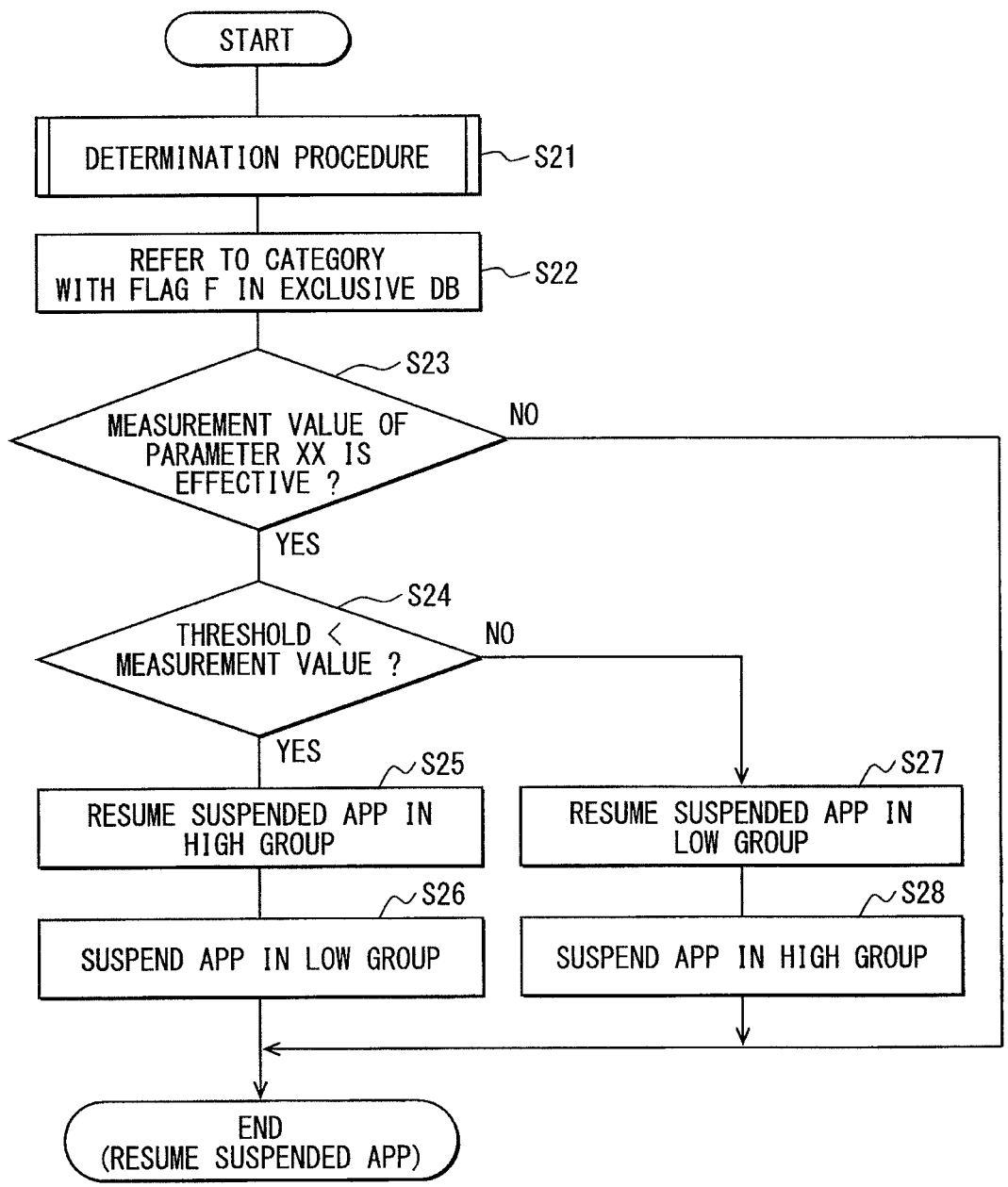
FIG. 5 is a flowchart of an execution process according to the embodiment.

Next, an execution process by which the selector 32 selects the priority application to be executed with high priority and the executer 33 executes the priority application selected by the selector 32 is described with reference to FIG. 5. The execution process is repeatedly executed at a predetermined time interval, while the executer 33 executes the application based on the priority value item of the attribute information items.

The execution process starts at S21 where a determination procedure is performed. In the determination procedure, the selector 32 determines whether similar applications with similar uses are executed by the executer 33. The determination procedure is described in detail later with reference to FIG. 6.

If the selector 32 determines at S21 that the similar applications are running, the execution process proceeds to S22. At S22, the selector 32 refers to a category assigned with an exclusive flag F assigned to the similar applications in the exclusive database 42. Then, at S23, the selector 32 determines whether an actual measurement value of a parameter XX assigned to the category assigned with the exclusive flag F is effective. That is, at S23, the selector 32 determines whether the actual measurement value of the parameter XX is obtained. If the actual measurement value of the parameter XX is not effective corresponding to NO at S23, the execution process ends. At this time, if a suspended application exists, the execution process ends after resuming the suspended application.

In contrast, if the actual measurement value of the parameter XX is effective corresponding to YES at S23, the execution process proceeds to S24. At S24, the selector 32 determines whether the actual measurement value of the parameter XX is higher than a parameter threshold of the parameter XX. If the actual measurement value of the parameter XX is higher than the parameter threshold of the parameter XX corresponding to YES at S24, the execution process proceeds to S25. In contrast, if the actual measurement value of the parameter XX is not higher than the parameter threshold of the parameter XX corresponding to NO at S24, the execution process proceeds to S27.

At S25, the selector 32 selects the application belonging to the high group. In this case, if the application belonging to the high group remains suspended, the executer 33 resumes the suspended application belonging to the high group. Then, the execution process proceeds to S26 from S25. At S26, the executer 33 suspends the application belonging to the low group. After S26, the execution process ends. At this time, if a suspended application exists, the execution process ends after resuming the suspended application.

In contrast, at S27, the selector 32 selects the application belonging to the low group. In this case, if the application belonging to the low group remains suspended, the executer 33 resumes the suspended application belonging to the low group. Then, the execution process proceeds to S28 from S27. At S28, the executer 33 suspends the application belonging to the high group. After S28, the execution process ends. At this time, if a suspended application exists, the execution process ends after resuming the suspended application.

Figure 6:
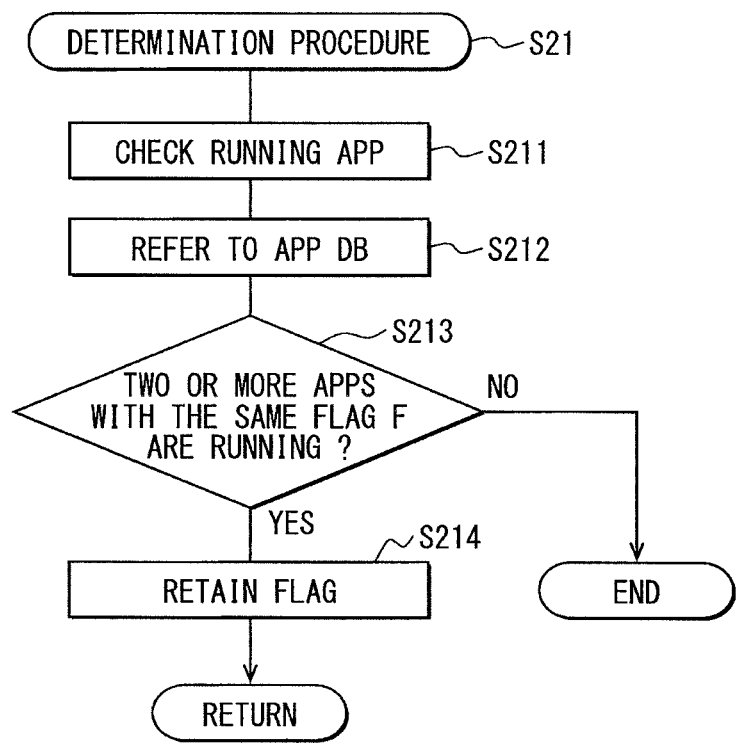
FIG. 6 is a flowchart of a determination procedure included in the execution process.

Next, the determination procedure performed at S21 by the selector 32 is described with reference to FIG. 6.

The determination procedure starts at S211 where the selector 32 checks a running application. Specifically, at S211, the selector 32 obtains an ID number of the running application. Then, at S212, the selector 32 refers to the application database 41. Specifically, the selector 32 refers to an exclusive flag of the attribute information items corresponding to the ID number obtained at S211.

Then, at S213, the selector 32 determines whether two or more applications with the same exclusive flag F are running. That is, the selector 32 determines whether two or more applications with the exclusive flag referred at S212 are running. If two or more applications with the same exclusive flag F are not running corresponding to NO at S213, the determination procedure ends.

In contrast, if two or more applications with the same exclusive flag F are running corresponding to YES at S213, the determination procedure proceeds to S214. At A214, the selector 32 retains the exclusive flag F. After S214, the determination procedure ends, and the execution process proceeds to S23 shown in FIG. 5.

Advantages of the embodiment can be summarized as follows.

A priority application to be executed with high priority is selected from similar applications with similar uses according to the driving situation of the vehicle. That is, execution of the similar applications except the priority application is restricted. Therefore, hardware resources such as a central processing unit and an output device can be effectively used.

The actual measurement value of the parameter is compared with the corresponding parameter threshold in each category, and the priority application is selected based on a result of the comparison. Thus, the priority application can be suitably selected from the similar applications according to the driving situation of the vehicle.

When a new application is registered into the application database 41, the category and the group to which the new application should belong are determined based on the attribute information items of the new application and registered into the exclusive database 42.

When the actual measurement value of the degree of wakefulness of the driver is higher than the corresponding parameter threshold (i.e., X), the lane departure warning application is executed in priority to the lane keep assist application. Therefore, when the vehicle begins to move out of its intended lane, the driver is warned and prompted to control the steering of the vehicle by himself or herself to return the vehicle to the lane. In contrast, when the actual measurement value of the degree of wakefulness of the driver is not higher than the corresponding parameter threshold, the lane keep assist application is executed in priority to the lane departure warning application. Therefore, when the vehicle begins to move out of its intended lane, the driver is warned and assisted in controlling the steering of the vehicle to return the vehicle to the lane. In this way, the priority application is selected from the similar applications according to the degree of wakefulness of the driver and executed.

When the actual measurement value of the vehicle speed is higher than the corresponding parameter threshold (i.e., Y), the front collision warning application is executed in priority to a peripheral information provision application including the peripheral monitor application and the around view application. Therefore, when the vehicle approaches too close to the obstacle ahead of the vehicle, the driver is warned and prompted to reduce the vehicle speed by himself or herself. In contrast, when the actual measurement value of the vehicle speed is not higher than the corresponding parameter threshold, the peripheral information provision application is executed in priority to the lane departure warning application. Therefore, when the vehicle turns left or right, the driver can drive the vehicle to prevent the vehicle from colliding with the obstacle around the vehicle, and also the drive can be assisted in parking the vehicle. In this way, the priority application is selected from the similar applications according to the vehicle speed and executed.

When the actual measurement value of the degree of the traffic congestion is higher than the corresponding parameter threshold (i.e., Z), the inter-vehicle distance keep application is executed in priority to the speed limit sign recognition application. Therefore, the driver can know a distance between the vehicle and another vehicle ahead of the vehicle. Further, when the distance becomes less than a safe distance, the driver is warned and prompted to increase the distance. In contrast, when the actual measurement value of the degree of the traffic congestion is not higher than the corresponding parameter threshold, the speed limit sign recognition application is executed in priority to the inter-vehicle distance keep application. Therefore, the driver can know a speed limit of a road where the vehicle runs. Further, when the vehicle speed exceeds the speed limit, the driver is warned and prompted to reduce the vehicle speed. In this way, the priority application is selected from the similar applications according to the degree of the traffic congestion and executed.

The similar applications are categorized into the same category and divided into groups in each category based the attribute information items added to each application.

The similar applications can be easily identified based on the use tag item of the attribute information items.

An exclusive flag assigned to a certain application in the exclusive database 42 is added as attribute information items of the certain application in the application database 41. In such an approach, similar applications can be identified from the applications registered in the application database 41.

Even when the executer 33 simultaneously executes similar applications based on the priority values, one of the similar applications is executed with high priority according to the driving situation, and execution of the other(s) of the similar applications is restricted. Thus, the hardware resources can be effectively used.

MODIFICATIONS

The embodiment can be modified in various ways, for example, as follows.

No exclusive flag can be added to the attribute information items of the application in the application database 41. In this case, at S212, the selector 32 refers to the exclusive database 42 instead of the application database 41, and at S213, the selector 32 determines whether two or more applications with the same exclusive flag F are running.

In each category, the applications can be divided into three or more groups. In this case, the number of the parameter thresholds is one smaller than the number of the groups, and the number of the exclusive execution conditions is equal to the number of the groups.

When the hardware resources are enough, there is no need to suspend the application at S26 and S28. That is, when the hardware resources are enough under a condition that the application selected by the selector 32 is executed, the executer 33 can execute the application which is not selected by the selector 32 while executing the application selected by the selector 32.

What is claimed is:

1. An information terminal capable of being mounted on a vehicle and capable of executing applications, the information terminal comprising:
    a categorizer configured to categorize the applications into categories;
    a selector configured to select a priority application from each category according to a driving situation of the vehicle, the priority application being defined as an application to be executed with higher priority than any other application in each category; and
    an executer configured to execute the priority application selected by the selector, wherein
    the categorizer categorizes the applications into the categories according to their use so that similar applications with similar uses are categorized into the same category,
    the vehicle has an obtaining device configured to obtain actual measurement values of parameters for identifying the driving situation,
    the categorizer assigns the parameters and parameter thresholds to the categories separately, and
    the selector selects the priority application by comparing the parameter with a corresponding parameter threshold in each category.

2. The information terminal according to claim 1, further comprising:
    an application database configured to store the applications and attribute information items, the attribute information items being added to each application;
    an exclusive database configured to store the categorized applications, the parameters, and the parameter thresholds; and
    an updater configured to update the application database, wherein
    when the updater updates the application database by registering a new application into the application database, the categorizer registers the new application into the exclusive database based on the attribute information items of the new application.

3. The information terminal according to claim 1, wherein
    the parameters includes a first parameter which is a degree of wakefulness of a driver of the vehicle,
    the category assigned with the first parameter includes a lane departure warning application and a lane keep assist application,
    the selector selects the lane departure warning application as the priority application, when the actual measurement value of the first parameter is higher than the corresponding parameter threshold, and
    the selector selects the lane keep assist application as the priority application, when the actual measurement value of the first parameter is not higher than the corresponding parameter threshold.

4. The information terminal according to claim 1, wherein
    the parameters includes a second parameter which is a speed of the vehicle,
    the category assigned with the second parameter includes a front collision warning application and a peripheral information provision application,
    the selector selects the front collision warning application as the priority application, when the actual measurement value of the second parameter is higher than the corresponding parameter threshold, and
    the selector selects the peripheral information provision application as the priority application, when the actual measurement value of the second parameter is not higher than the corresponding parameter threshold.

5. The information terminal according to claim 1, wherein
    the parameters includes a third parameter which is a degree of traffic congestion,
    the category assigned with the third parameter includes an inter-vehicle distance keep application and a speed limit sign recognition application,
    the selector selects the inter-vehicle distance keep application as the priority application, when the actual measurement value of the third parameter is higher than the corresponding parameter threshold, and
    the selector selects the speed limit sign recognition application as the priority application, when the actual measurement value of the third parameter is not higher than the corresponding parameter threshold.

6. The information terminal according to claim 1, wherein
    attribute information items are added to each application, and
    the categorizer identifies the applications in each category based on the attribute information items.

7. The information terminal according to claim 1, wherein
    attribute information items are added to each application,
    the attribute information items includes a use tag indicative of a use of the application, and
    the categorizer categorizes the applications into the categories based on the use tag.

8. The information terminal according to claim 2, wherein
    each category is assigned with a different exclusive flag in the exclusive database, and
    the updater adds the exclusive flag, which is assigned to a certain application in the exclusive database, to attribute information items of the certain application in the application database.

9. The information terminal according to claim 8, wherein
    the attribute information items includes a priority value for execution of the application,
    the selector determines whether the executer simultaneously executes the applications having the same exclusive flags based on the priority value, and when the selector determines that the executer simultaneously executes the applications having the same exclusive flags, the selector selects the priority application from the applications having the same exclusive flag.

10. An information terminal capable of being mounted on a vehicle and capable of executing applications, the information terminal comprising:

a categorizer configured to categorize the applications into categories based on a use tag indicative of a use of the application, wherein attribute information items including the use tag are added to each application;

a selector configured to select a priority application from each category based on a usefulness of the application determined according to a driving situation of the vehicle, the priority application being defined as an application to be executed with higher priority than any other application in each category; and an executer configured to execute the priority application selected by the selector.

\* \* \* \* \*